(12) United States Patent
Jungbluth

(10) Patent No.: US 9,057,597 B2
(45) Date of Patent: Jun. 16, 2015

(54) METHOD FOR DETERMINING THE ROUGHNESS OF AN INTERNAL SURFACE

(71) Applicant: Matthias Jungbluth, Berlin (DE)

(72) Inventor: Matthias Jungbluth, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 318 days.

(21) Appl. No.: 13/664,473

(22) Filed: Oct. 31, 2012

(65) Prior Publication Data

US 2013/0106446 A1 May 2, 2013

(30) Foreign Application Priority Data

Nov. 2, 2011 (EP) .................................... 11187426

(51) Int. Cl.
*H01L 39/22* (2006.01)
*G01B 7/34* (2006.01)

(52) U.S. Cl.
CPC ........................ *G01B 7/34* (2013.01)

(58) Field of Classification Search
USPC ..................... 324/71.1, 76.19, 699
See application file for complete search history.

(56) References Cited

U.S. PATENT DOCUMENTS

| | | |
|---|---|---|
| 5,015,950 A | 5/1991 | Moulder |
| 5,228,776 A * | 7/1993 | Smith et al. ................. 374/5 |
| 6,024,792 A | 2/2000 | Bieler |
| 2007/0299628 A1 | 12/2007 | Sun |
| 2011/0177292 A1* | 7/2011 | Teshima et al. ............ 428/156 |
| 2013/0108118 A1* | 5/2013 | Hinaga et al. ............. 382/108 |

FOREIGN PATENT DOCUMENTS

| | | |
|---|---|---|
| DE | 102005040857 B3 | 2/2007 |
| DE | 102008059032 A1 | 4/2010 |
| EP | 0486489 B1 | 11/1994 |
| EP | 0412397 B1 | 3/1998 |
| EP | 0892090 A1 | 1/1999 |
| EP | 0786017 B1 | 3/1999 |
| EP | 1306454 A1 | 5/2003 |
| EP | 1319729 A1 | 6/2003 |
| EP | 1204776 B1 | 6/2004 |
| WO | WO 9967435 A1 | 12/1999 |
| WO | WO 0044949 A1 | 8/2000 |

* cited by examiner

Primary Examiner — Vincent Q Nguyen

(57) ABSTRACT

A method for determining the roughness of an internal surface of a metal substrate or a metal layer is provided. By the correlation of a single destructive measurement in order to determine the roughness and the conductivity measurement of a transition region, the roughness is determined for other samples without destructive measurement.

6 Claims, 3 Drawing Sheets

| Material | Chemical composition in % | | | | | | | | | | | | | |
|---|---|---|---|---|---|---|---|---|---|---|---|---|---|---|
| | C | Cr | Ni | Co | Mo | W | Ta | Nb | Al | Ti | B | Zr | Hf |
| Ni-based precision casting alloys | | | | | | | | | | | | | | |
| GTD 222 | 0.10 | 22.5 | Remainder | 19.0 | | 2.0 | 1.0 | | 1.2 | 2.3 | 0.008 | | |
| IN 939 | 0.15 | 22.4 | Remainder | 19.0 | | 2.0 | 1.4 | 1.0 | 1.9 | 3.7 | 0.009 | 0.10 | |
| IN 6203 DS | 0.15 | 22.0 | Remainder | 19.0 | | 2.0 | 1.1 | 0.8 | 2.3 | 3.5 | 0.010 | 0.10 | 0.75 |
| Udimet 500 | 0.10 | 18.0 | Remainder | 18.5 | 4.0 | | | | | | | | | |
| | | | | | | | | | 2.9 | 2.9 | 0.016 | 0.05 | |
| IN 738 LC | 0.10 | 16.0 | Remainder | 8.5 | 1.7 | 2.6 | 1.7 | 0.9 | 3.4 | 3.4 | 0.010 | 0.10 | |
| SC 16 | <0.01 | 16.0 | Remainder | | 3.0 | | 3.5 | | 3.5 | 3.5 | <0.005 | <0.008 | |
| Rene 80 | 0.17 | 14.0 | Remainder | 9.5 | 4.0 | 4.0 | | | 3.0 | 5.0 | 0.015 | 0.03 | |
| GTD 111 | 0.10 | 14.0 | Remainder | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Remainder | 9.0 | 1.9 | 4.1 | 4.1 | | 3.4 | 3.8 | 0.015 | 0.02 | 1.00 |
| IN 792 DS | 0.08 | 12.5 | Remainder | 9.0 | 1.9 | 4.1 | 4.1 | | 3.4 | 3.8 | 0.015 | 0.02 | 1.50 |
| MAR M 002 | 0.15 | 9.0 | Remainder | 10.0 | | 10.0 | 2.5 | | 5.5 | 1.5 | 0.015 | 0.05 | 1.40 |
| MAR M 247 LC DS | 0.07 | 8.1 | Remainder | 9.2 | 0.5 | 9.5 | 3.2 | | 5.6 | 0.7 | 0.015 | 0.02 | 1.40 |
| CMSX-2 | <.006 | 8.0 | Remainder | 4.6 | 0.6 | 8.0 | 6.0 | | 5.6 | 1.0 | <.003 | <.0075 | |
| CMSX-3 | <.006 | 8.0 | Remainder | 4.6 | 0.6 | 8.0 | 6.0 | | 5.6 | 1.0 | <.003 | <.0075 | 0.10 |
| CMSX-4 | | 6.0 | Remainder | 10.0 | | 6.0 | 6.0 | | 5.6 | 1.0 | | Re=3.0 | 0.10 |
| CMSX-6 | <.015 | 10.0 | Remainder | 5.0 | 3.0 | <.10 | 2.0 | <.10 | 4.9 | 4.8 | <.003 | <.0075 | 0.10 |
| PWA 1480 SX | <.006 | 10.0 | Remainder | 5.0 | | 4.0 | 12.0 | | 5.0 | 1.5 | <.0075 | <.0075 | |
| PWA 1483 SX | 0.07 | 12.2 | Remainder | 9.0 | 1.9 | 3.8 | 5.0 | | 3.6 | 4.2 | 0.0001 | 0.002 | |
| Co-based precision casting alloys | | | | | | | | | | | | | | |
| FSX 414 | 0.25 | 29.0 | 10 | Remainder | | 7.5 | | | | | 0.010 | | |
| X 45 | 0.25 | 25.0 | 10 | Remainder | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR M-509 | 0.65 | 24.5 | 11 | Remainder | | 7.5 | 4 | | | 0.3 | 0.010 | 0.60 | |
| CM 247 | 0.07 | 8.3 | Remainder | 10.0 | 0.5 | 9.5 | 3.2 | | 5.5 | 0.7 | | | 1.5 |

METHOD FOR DETERMINING THE ROUGHNESS OF AN INTERNAL SURFACE

CROSS REFERENCE TO RELATED APPLICATIONS

This application claims priority of European Patent Office application No. 11187426.9 EP filed Nov. 2, 2011. All of the applications are incorporated by reference herein in their entirety.

FIELD OF INVENTION

The invention relates to a method for determining the roughness of an internal layer or of a substrate.

BACKGROUND OF INVENTION

Roughnesses play an important role particularly in the case of sprayed layers, in that they contribute to the adhesion of an overlying layer. This is, for example, the roughness of a metal corrosion protection layer on which a ceramic layer is applied.

Methods are likewise known for measuring the conductivity of metal layers.

If the roughness of a surface is no longer freely accessible, there are only destructive examination methods.

SUMMARY OF INVENTION

It is therefore an object of the invention to solve this problem.

The object is achieved by a method as claimed in the claims.

Further advantageous measures, which may be combined with one another in any desired way in order to achieve further advantages, are listed in the dependent claims.

BRIEF DESCRIPTION OF THE DRAWINGS

FIG. 4 shows a combustion chamber and
FIG. 5 shows a list of superalloys.

DETAILED DESCRIPTION OF INVENTION

Figure 1:
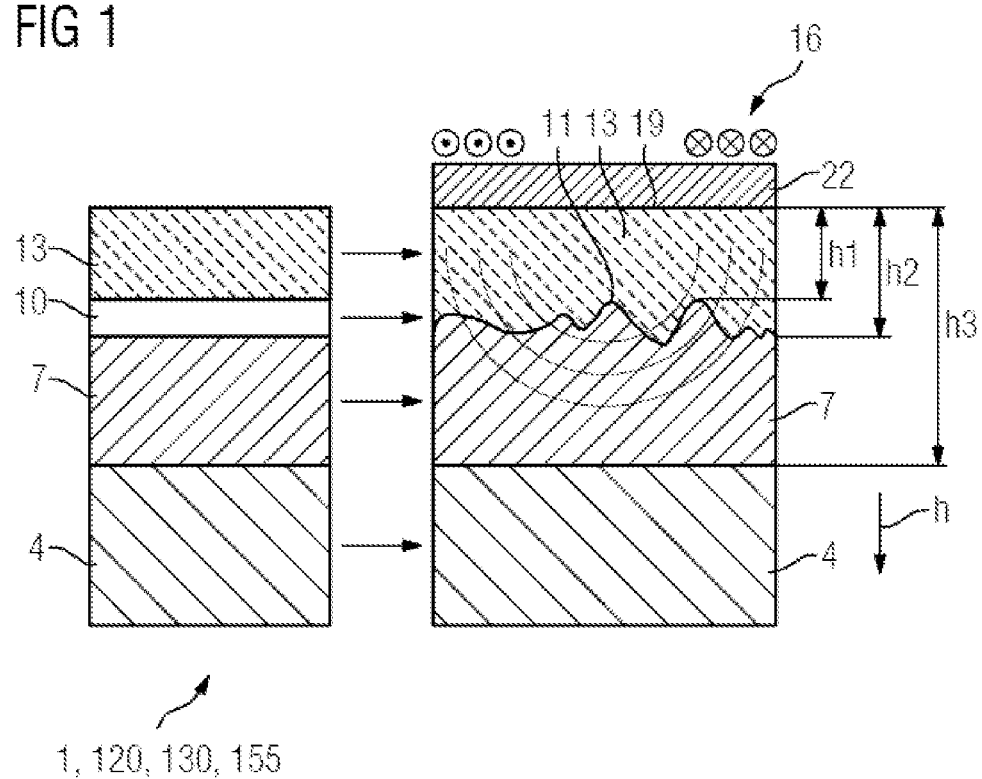
FIG. 1 shows such a layer system and the procedure.

The description and the figures merely represent exemplary embodiments of the invention. FIG. 1 shows a layer system 1, 120, 130 (FIG. 3), 155 (FIG. 4) as an example.

The layer system comprises a substrate 4, which may be metallic or ceramic, and particularly in the case of turbine components 120, 130, 155 it is a nickel- or cobalt-based superalloy, in particular according to FIG. 5.

A metal layer 7 is preferably applied on the substrate 4. This may be an aluminide layer (+Pt, . . . ) or in particular an MCrAlX layer, where X is optionally and in particular yttrium (Y) or rhenium (Re).

The metal layer 7 or the substrate 4 has a surface 11 with a roughness, which is intended to be determined, in a layer region 10. This cannot be determined directly, since there is an electrically nonconductive layer 13, in particular a ceramic layer 13, on the metal layer 7 or the substrate 4.

Particularly in the case of turbine components 120, 130, 155, this is a ceramic layer.

The ceramic layer 13 comprises zirconium oxide and/or a pyrochlore structure. It is configured in one coat or two coats.

Methods are known, in particular eddy current methods, in which the electrical conductivity as a parameter P (used here only by way of example in order to explain the method) of a highly conductive region 7, 4 can be measured by means of electrical excitation 16.

The penetration depths of such currents can be varied, and is also used for layer thickness measurement of such an internal layer 7. At a distance h from the outermost surface 19, which due to measurement technology has a certain lift-off 22, up to a depth h1 there is no measurable electrical conductivity or low electrical conductivity.

In the layer region up to the depth h2, there is the layer region 10 consisting of metallic and ceramic material, since the surface 11 of the layer 7 is rough. Metallic material and ceramic material, which is significantly less electrically conductive, is therefore present in the transition region 10.

Beyond a layer depth h2 only a metallic material is measured, here the coating 7 (since measurement is carried out layerwise within the layers 13, 10, 7).

Figure 2:
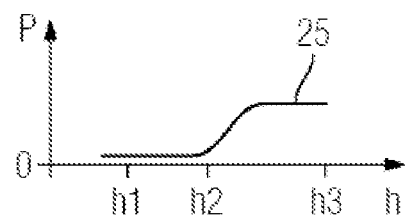
FIG. 2 shows a measurement curve.

By corresponding measurement parameters, the accuracy of the penetration depth can thus be enhanced so that it is much less than (h2−h1), in particular at least ≤0.2*(h2−h1), where (h2−h1) is the thickness of the transition region 10. This conductivity can be determined. The profile for this value, in general P, is represented in FIG. 2.

In a preferably single comparison step, the conductivity or the parameter P is correlated by a destructive determination with the roughness of the layer region 10.

The conductivity in the transition region 10 is thus measured and then the roughness is determined destructively.

The roughness may be based on various roughness values.

The rise in the conductivity P (FIG. 2), starting from the nonconductive layer, can therefore be correlated with the roughness and at other positions, or on other components, a correlation can be established by the same conductivity measurement between the roughness to be determined and the known, measured value P, or the curve P(h). Further parameters P, such as thermal conductivity, may be used.

Figure 3:
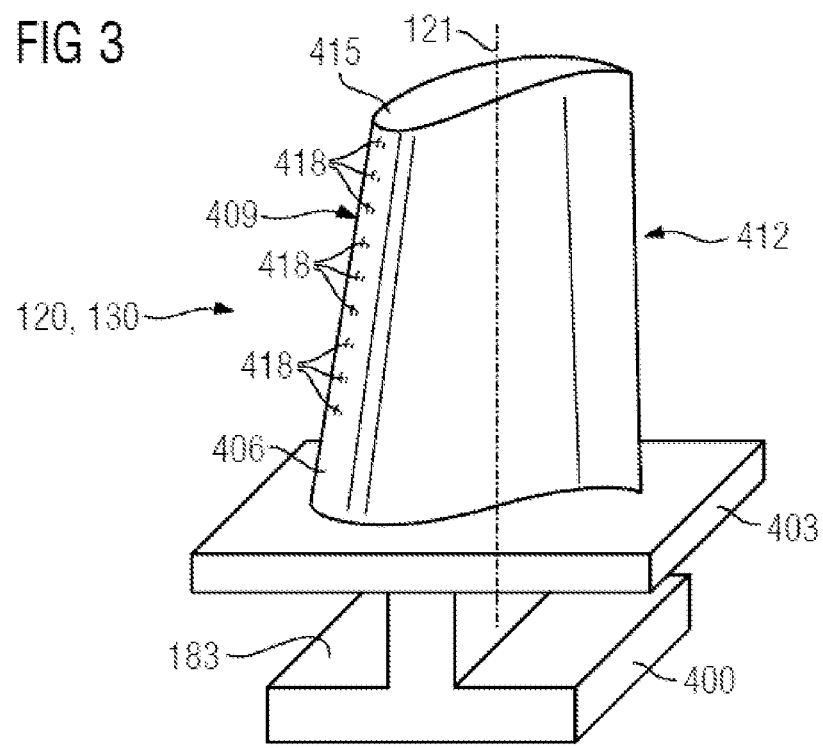
FIG. 3 shows a turbine blade.

FIG. 3 shows a perspective view of a rotor blade 120 or guide vane 130 of a turbomachine, which extends along a longitudinal axis 121.

The turbomachine may be a gas turbine of an aircraft or of a power plant for electricity generation, a steam turbine or a compressor.

The blade 120, 130 comprises, successively along the longitudinal axis 121, a fastening region 400, a blade platform 403 adjacent thereto as well as a blade surface 406 and a blade tip 415.

As a guide vane 130, the vane 130 may have a further platform (not shown) at its vane tip 415.

A blade root 183 which is used to fasten the rotor blades 120, 130 on a shaft or a disk (not shown) is formed in the fastening region 400.

The blade root 183 is configured, for example, as a hammerhead. Other configurations as a firtree or dovetail root are possible.

The blade 120, 130 comprises a leading edge 409 and a trailing edge 412 for a medium which flows past the blade surface 406.

In conventional blades 120, 130, for example solid metallic materials, in particular superalloys, are used in all regions 400, 403, 406 of the blade 120, 130.

Such superalloys are known for example from EP 1 204 776 B1, EP 1 306 454, EP 1 319 729 A1, WO 99/67435 or WO 00/44949.

The blade 120, 130 may in this case be manufactured by a casting method, also by means of directional solidification, by a forging method, by a machining method or combinations thereof.

Workpieces with a single-crystal structure or single-crystal structures are used as components for machines which are exposed to heavy mechanical, thermal and/or chemical loads during operation.

Such single-crystal workpieces are manufactured, for example, by directional solidification from the melt. These are casting methods in which the liquid metal alloy is solidified to form the single-crystal structure, i.e. to form the single-crystal workpiece, or is directionally solidified.

Dendritic crystals are in this case aligned along the heat flux and form either a rod crystalline grain structure (columnar, i.e. grains which extend over the entire length of the workpiece and in this case, according to general terminology usage, are referred to as directionally solidified) or a single-crystal structure, i.e. the entire workpiece consists of a single crystal. It is necessary to avoid the transition to globulitic (polycrystalline) solidification in these methods, since non-directional growth will necessarily form transverse and longitudinal grain boundaries which negate the beneficial properties of the directionally solidified or single-crystal component.

When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures.

Such methods are known from U.S. Pat. No. 6,024,792 and EP 0 892 090 A1.

The blades 120, 130 may also have coatings against corrosion or oxidation, for example MCrAlX (M is at least one element from the group iron (Fe), cobalt (Co), nickel (Ni), X is an active element and stands for yttrium (Y) and/or silicon and/or at least one rare earth element, or hafnium (Hf)). Such alloys are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an interlayer or as the outermost layer).

The layer composition preferably comprises Co-30Ni-28Cr-8Al-0.6Y-0.7Si or Co-28Ni-24Cr-10Al-0.6Y. Besides these cobalt-based protective coatings, it is also preferable to use nickel-based protective layers such as Ni-10Cr-12Al-0.6Y-3Re or Ni-12Co-21Cr-11Al-0.4Y-2Re or Ni-25Co-17Cr-10Al-0.4Y-1.5Re.

On the MCrAlX, there may furthermore be a thermal barrier layer, which is preferably the outermost layer and consists for example of $ZrO_2$, $Y_2O_3$—$ZrO_2$, i.e. it is not stabilized or is partially or fully stabilized by yttrium oxide and/or calcium oxide and/or magnesium oxide.

The thermal barrier layer covers the entire MCrAlX layer.

Rod-shaped grains are produced in the thermal barrier layer by suitable coating methods, for example electron beam deposition (EB-PVD).

Other coating methods may be envisaged, for example atmospheric plasma spraying (APS), LPPS, VPS or CVD. The thermal barrier layer may comprise porous, micro- or macro-cracked grains for better thermal shock resistance. The thermal barrier layer is thus preferably more porous than the MCrAlX layer.

Refurbishment means that components 120, 130 may need to be stripped of protective layers (for example by sandblasting) after their use. The corrosion and/or oxidation layers or products are then removed. Optionally, cracks in the component 120, 130 are also repaired. The component 120, 130 is then recoated and the component 120, 130 is used again.

The blade 120, 130 may be designed to be hollow or solid. If the blade 120, 130 is intended to be cooled, it will be hollow and optionally also comprise film cooling holes 418 (indicated by dashes).

Figure 4:
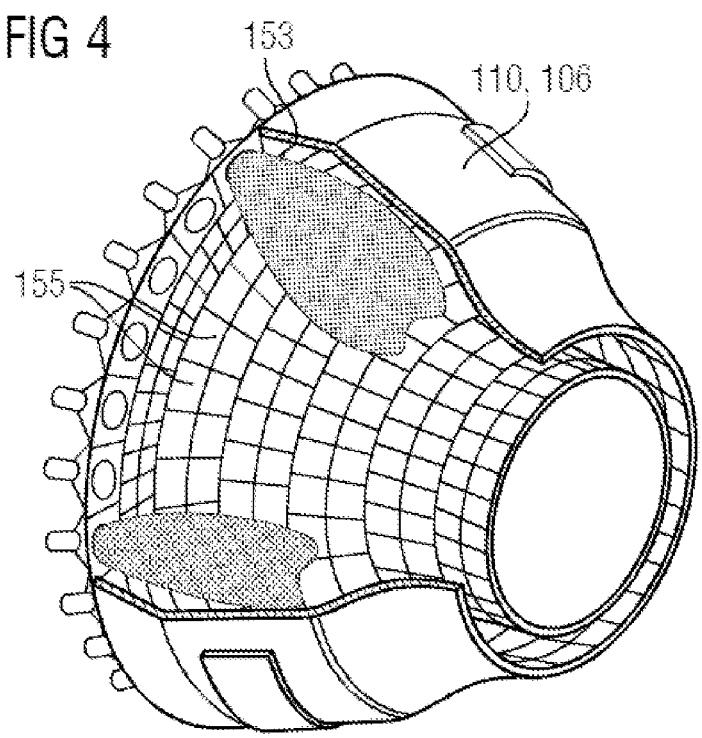

FIG. 4 shows a combustion chamber 110 of a gas turbine. The combustion chamber 110 is designed for example as a so-called ring combustion chamber in which a multiplicity of burners 107, arranged in the circumferential direction around a rotation axis 102, open into a common combustion chamber space 154, and generate flames 156. To this end, the combustion chamber 110 as a whole is designed as an annular structure which is positioned around the rotation axis 102.

In order to achieve a comparatively high efficiency, the combustion chamber 110 is designed for a relatively high temperature of the working medium M, i.e. about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M.

Each heat shield element 155 consisting of an alloy is equipped with a particularly heat-resistant protective layer (MCrAlX layer and/or ceramic coating) on the working medium side, or is made of refractory material (solid ceramic blocks).

These protective layers may be similar to the turbine blades, i.e. for example MCrAlX: M is at least one element from the group iron (Fe), cobalt (Co), nickel (Ni), X is an active element and stands for yttrium (Y) and/or silicon and/or at least one rare earth element, or hafnium (Hf). Such alloys are known from EP 0 486 489 B1, EP 0 786 017 B1, EP 0 412 397 B1 or EP 1 306 454 A1.

On the MCrAlX, there may furthermore be a thermal barrier layer for example a ceramic thermal barrier layer, which consists for example of $ZrO_2$, $Y_2O_3$—$ZrO_2$, i.e. it is not stabilized or is partially or fully stabilized by yttrium oxide and/or calcium oxide and/or magnesium oxide.

Rod-shaped grains are produced in the thermal barrier layer by suitable coating methods, for example electron beam deposition (EB-PVD).

Other coating methods may be envisaged, for example atmospheric plasma spraying (APS), LPPS, VPS or CVD. The thermal barrier layer may comprise porous, micro- or macro-cracked grains for better thermal shock resistance.

Refurbishment means that heat shield elements 155 may need to be stripped of protective layers (for example by sandblasting) after their use. The corrosion and/or oxidation layers or products are then removed. Optionally, cracks in the heat shield element 155 are also repaired. The heat shield elements 155 are then recoated and the heat shield elements 155 are used again.

Owing to the high temperatures inside the combustion chamber 110, a cooling system may also be provided for the heat shield elements 155 or for their retaining elements. The heat shield elements 155 are then, for example, hollow and optionally also have cooling holes (not shown) opening into the combustion chamber space 154.

I claim:

1. A method for determining the roughness of an internal surface of a metal substrate or a metal layer below an electrically nonconductive layer, comprising:

wherein a material parameter is measured layerwise through the electrically nonconductive layer, in a transition region of the outer electrically nonconductive layer and the internal metal substrate or metal layer, until this material parameter rises and reaches a maximum plateau value, and wherein the material parameter in the transition region is correlated with the roughness of comparative samples, and the roughness has been determined beforehand.

2. The method as claimed in claim 1, wherein the roughness is determined by micrographs.

3. The method as claimed in claim 1, wherein the electrically nonconductive layer is a ceramic substrate layer.

4. The method as claimed in claim 1, wherein an electrical conductivity is determined as the material parameter.

5. The method as claimed in claim 1, wherein a thermal conductivity is determined as the material parameter.

6. The method as claimed in claim 3, wherein a layer system consisting of a the metal substrate, the metal layer and the outermost ceramic layer is analyzed.

* * * * *